United States Patent
Fields

[11] 3,778,149
[45] Dec. 11, 1973

[54] METHOD AND APPARATUS FOR MAKING MULTIPLE COPIES FROM AN ORIGINAL

[75] Inventor: Gary D. Fields, Parker, Colo.

[73] Assignee: Eastman Kodak Company, Rochester, N.Y.

[22] Filed: Feb. 17, 1972

[21] Appl. No.: 227,238

[52] U.S. Cl............................ 355/16, 350/160 LC
[51] Int. Cl............................................. G03g 15/14
[58] Field of Search.................. 350/160 R, 160 LC; 355/16

[56] References Cited
UNITED STATES PATENTS

| | | | |
|---|---|---|---|
| 3,639,049 | 2/1972 | Rhodes | 355/3 |
| 3,610,732 | 10/1971 | Mack | 350/160 R |
| 3,619,054 | 11/1971 | Goffe | 355/16 |
| 3,582,206 | 6/1971 | Burdige | 355/16 |

OTHER PUBLICATIONS
Keyes, "Liquid Crystal Electrophotographic Display", 12 IBM Tech. Disclosure Bul. 2135 (May 1970)

*Primary Examiner*—Samuel S. Matthews
*Assistant Examiner*—Michael D. Harris
*Attorney*—W. H. J. Kline et al.

[57] ABSTRACT

Apparatus is disclosed for making multiple copies from an original by forming a first temporary image from the original which temporary image is used to sequentially expose a plurality of photosensitive surfaces to form multiple images. Thus, while successive photosensitive surfaces are being exposed, a first original may be replaced in an exposure station with another original from which copies are to be made. Time delay is reduced since the original from which subsequent copies are to be made can be positioned in the exposure station while multiple copies are being made from a temporary image formed from the first original. The temporary image is formed on a photoconductive-liquid crystal sandwich by a first source of radiation to which the photoconductive layer is sensitive, and is projected by a second source of radiation which may be within another portion of the electromagnetic spectrum to which the photoconductive layer is not sensitive.

15 Claims, 1 Drawing Figure

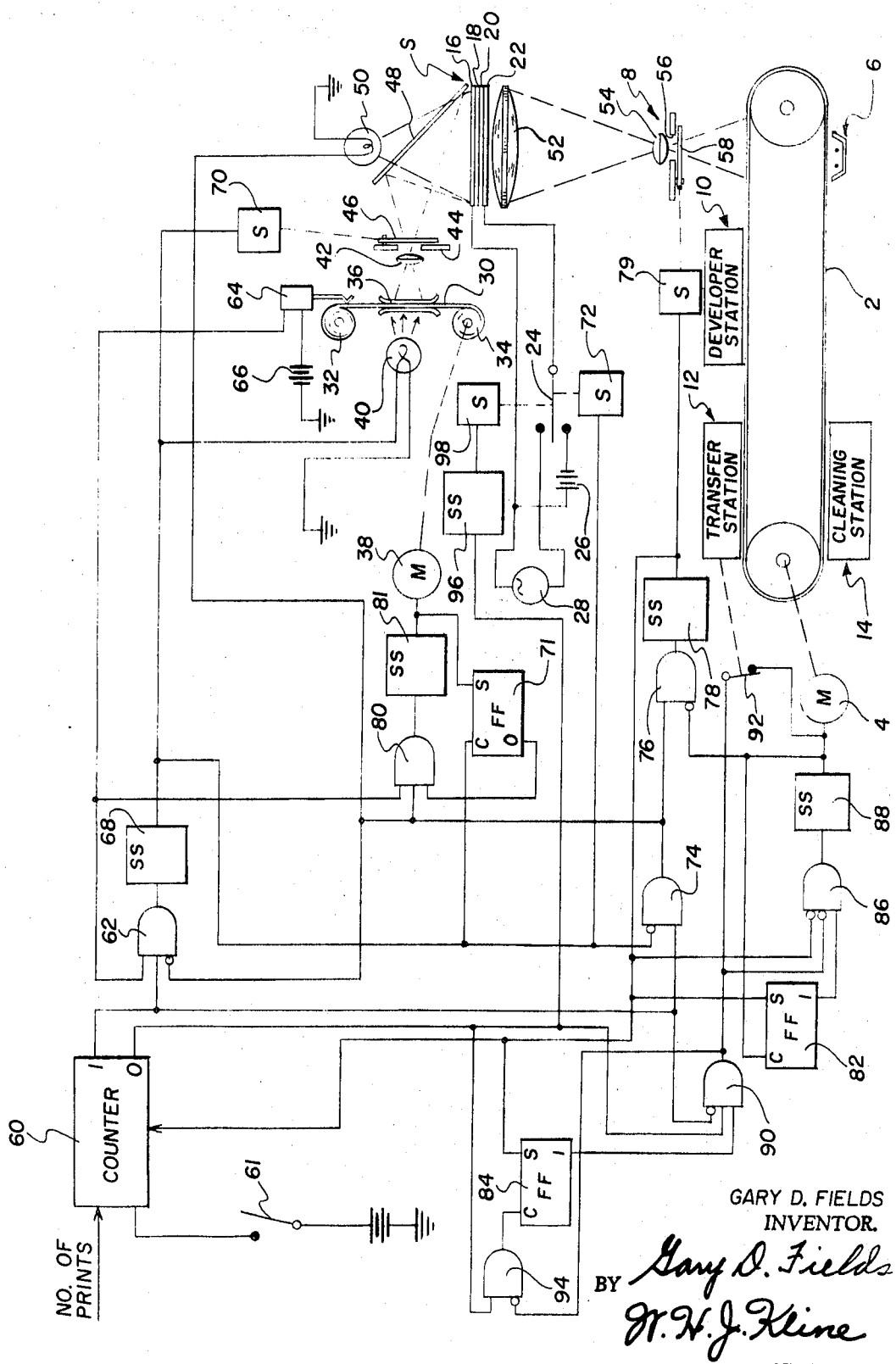

3,778,149

METHOD AND APPARATUS FOR MAKING MULTIPLE COPIES FROM AN ORIGINAL

BACKGROUND OF THE INVENTION

1. Field of the Invention

This invention relates to a method and apparatus for making multiple copies from an original, and more particularly a method of making multiple copies from a first original by formation of a temporary image so that the first original can be replaced by a second original while copies are being made of the first original from the temporary image.

2. Description of the Prior Art

Toward the end of the 19th Century F. Reinitzer and O. Lehmann independently observed that certain substances in passing from a solid crystalline state to an isotropic liquid state pass through a state or condition over a given temperature range wherein they display rheological properties similar to that of fluids, but have optical properties similar to that of the crystalline state. In order to identify these properties, Lehmann used the term "liquid crystal", which terminology persists today. Present thinking tends to regard substances which exhibit these properties as being in a fourth state of matter known as the mesomorphic state or mesophase since it is a state or phase intermediate that of the anisotropic crystal and that of the isotropic liquid.

There are three distinct mesomorphic states or forms, namely, the smectic mesophase, the nematic mesophase and the cholesteric mesophase. A nematic liquid crystal is essentially transparent, and therefore transmits light, but when placed in a d.c. electric field the molecules of some of these liquid crystals become disoriented so that the material diffuses light and becomes milky white in appearance. When the d.c. electric field is removed, the molecules of the liquid crystal return to their previous orientation so that the liquid crystal is again transparent. This phenomena is discussed in PROCEEDINGS OF THE I.E.E.E., for July, 1968 in an article entitled: "Dynamic Scattering: A new Electro-optical Effect in Certain Classes of Nematic Liquid Crystals", By Heilmeier, Zanoni and Barton at pages 1162–1171.

The reflective optical storage effect of mixtures of cholesteric and nematic liquid crystal materials is discussed in a paper appearing in APPLIED PHYSICS LETTERS for Aug. 15, 1968 in an article entitled, "A New Electric Field Controlled Reflective Optical Storage Effect in Mixed-Liquid Crystal Systems", by Heilmeier and Goldmacher at pages 132 and 133, in which the authors described how a mixture of nematic and cholesteric mesomorphic materials serve as an optical storage under a d.c. or low frequency a.c. electric field, which changes the intially transparent material to a milky white light-diffusing material. The liquid crystal material remains in the light-diffusing state upon removal of the d.c. field. The mixture can be rapidly erased or changed back to a transparent state by the application of a high frequency a.c. signal greater than 700 Hz.

U.S. Pat. No. 2,892,380 to Baumann et al describes a schlieren-optical system for amplifying the light intensity of an optically projected image. A multiple layer control cell, consisting of a liquid crystal layer and a photoconductive layer, is bounded by a pair of electrodes which are connected to a d.c. source. The liquid crystal layer is a type which has an electric Kerr effect. An electrically nonconductive mirror is arranged between the photoconductive and liquid crystal layers to provide optical isolation between a light image and a secondary light source. The light image is rastered on the photoconductive layer so that it becomes conductive in those areas where light strikes it. This produces a nonhomogeneous electric field between the electrodes corresponding to the light image which results in local variations in the index of refraction of the liquid crystal material corresponding to the light image. Light from a secondary source is reflected from the nonconducting mirror surface in accordance with the image pattern on the liquid crystal and is projected onto a screen to form a visible image.

In many document copy machines, if multiple copies of an original are to be made, it is necessary to re-expose the original for each subsequent copy that is desired. Thus, after the last copy of an original is made there is a time delay while the first original is moved out of the exposure station and a second original is brought into the exposure station which imposes severe restrictions on machine speed. In some apparatus, an image of an original is projected onto a photosensitive surface which is developed to form a temporary image and this image in turn is projected onto a photosensitive receiver to form a copy. Such an apparatus is disclosed in U.S. Pat. No. 3,504,969 to R. W. Martel. However, this apparatus suffers the same shortcoming as the apparatus described above in that to make multiple copies, the original must be exposed once for each copy. Thus, when a new original is to be exposed a time delay is experienced while the first original is removed and a second original is positioned.

SUMMARY OF THE INVENTION.

In accordance with this invention, a method is provided comprising the steps of: forming a first temporary erasable image from a first original, exposing a first photosensitive surface at an exposure station to the first temporary image to form a latent image on the first photosensitive surface, removing the first photosensitive surface from the exposure station for development, positioning a second photosensitive surface at the exposure station for exposure and exposing the second photosensitive surface to the first temporary image to form a latent image on the second photosensitive surface. Exposure of subsequent photsensitive surfaces can continue until the desired number of copies are made. While multiple copies of the first original are being made a second original can be positioned for making a second temporary image. This method can be accomplished by means for forming successive erasable temporary images from a plurality of originals, means for exposing each of a plurality of photosensitive surfaces sequentially to each temporary image to form a plurality of latent images, and means for erasing each temporary image after a predetermined number of latent images have been made.

In one embodiment, the method of this invention is carried out by apparatus which includes a layered sandwich structure on which a temporary image can be formed. This layer structure includes, in order, a first transparent electrode, a photoconductive layer, a liquid crystal layer, and a second transparent electrode. Means are provided for apply a d.c. potential between the electrodes while a radiation pattern corresponding to the first original is projected by a first source of electromagnetic radiation onto the photoconductive layer to form a first temporary image on the liquid crystal layer. Means is provided for projecting the temporary image by a second source of electromagnetic radiation onto a photosensitive surface at an exposure station, such as a photoconductive member movable along an endless path past a series of electrophotographic stations after the potential across the electrodes is removed. Control means is provided which is responsive to projection of the temporary image to move a first original out of a projection plane and position a second original and which is further responsive after a predetermined exposure time sequentially to disable the temporary image projection means and to move the exposed photoconductive member to a developing station and to bring a second charged portion of the photoconductive member from a charging station into the exposure station and to project the temporary image onto the second charged portion of the photoconductive member to make a second copy.

Additional advantages of this invention will become apparent from the description which follows, taken in conjunction with the accompanying drawings.

BRIEF DESCRIPTION OF THE DRAWING

The drawing is a schematic representation of one embodiment of the invention.

DETAILED DESCRIPTION OF THE PREFERRED EMBODIMENT

In accordance with this invention, a temporary image is formed on a photoconductive-liquid crystal sandwich S, by projection of an image of an original by a first light source, which temporary image is projected by a second light source onto a photosensitive surface or material, such as a photoconductive belt 2 mounted to be driven along an endless path by a motor 4 past a charging station 6, an exposure station 8, a developing station 10, a transfer station 12, and a cleaning station 14.

The photoconductive-liquid crystal sandwich S comprises in order: a first transparent electrode 16, a transparent photoconductive layer 18, a control layer, such as a liquid crystal layer 20, and a second transparent electrode 22. A potential can be applied across electrode 16 and 22 by switch 24 which can be connected either to d.c. potential source 26 to form a temporary image in the liquid crystal layer or to a.c. potential source 28 to erase the temporary image on the liquid-crystal layer as will be more fully understood from the description below.

An original, such as film 30, is fed from a supply roll 32 to a take-up roll 34 through film guides 36 which define a projection plane and align successive film frames or images in an exposure position during movement of the film. The film may be incrementally advanced as by motor 38, as described below, to position seriatim successive original images to be projected. An image on the original is projected, as by a first illumination source, such as lamp 40. This original image is projected by lens 42 through an aperture 44, which is normally closed by a shutter 46, onto a beam splitter 48 which reflects the image from original 30 through transparent electrode 16 and onto photoconductive layer 18, while d.c. potential 26 is applied across electrodes 16 and 22 to establish an electric field therebetween. The photoconductive layer will act as though it is more conductive in the areas which are illuminated than it will in unilluminated areas so that a greater portion of the electric field is across corresponding portions of the liquid crystal 20 causing such portions to diffuse any light striking them thereby forming a temporary image corresponding to the original. A potential of 400 volts applied for 0.5 seconds has been found to satisfactorily form the temporary image.

A suitable liquid crystal material is a mixture of a nematic mesophase, such as N-[P-Methoxybenzylidene]-p-Butylaniline and a cholesteric mesophase of cholesteryl oleyl carbonate, wherein the mixture is 10 parts by weight of nematic mosophase to one part cholesteric mesophase. The photoconductive material can be 4, 4'-diethylamino-2, 2'--dimethyltriphenol methane and a polycarbonate resin together with a pyrylium dye prepared as in Example I of British Pat. No. 1,153,506 issued Sept. 29, 1969.

When the image is no longer needed, switch 24 is moved to bring alternating potential source 28 into the circuit, such as 600 volts at a frequency of 1000 Hz for one or two seconds, to return the liquid crystal layer to its quiescent or transparent state.

A suitable thickness for the liquid crystal layer is 12 microns and is 10 microns for the photoconductive layer. The two layers conveniently are separated by a layer of cellulose nitrate of one micron or less in thickness which layer is to inhibit adverse chemical reactions between the liquid crystal material and the photoconductive material.

The temporary image which is formed on liquid crystal layer 20 may be projected by a second illumination source, such as lamp 50. Radiation from lamp 50 passes through beam splitter 48 so that the image on the liquid crystal is projected by field lens 52 and objective lens 54, through aperture 56, normally closed by shutter 58, onto a charged portion of photoconductive web 2. Alternatively, beam splitter 48 can be replaced by a plane mirror which will reflect the image of the original onto the photoconductive-liquid crystal sandwich to form the temporary image and can be moved out of the optical path when the temporary image is to be projected by lamp 50.

While a temporary image is being projected to make multiple copies a second original can be positioned. If desired, a viewing screen, not shown, can be provided along with suitable apparatus for searching through a film supply for a particular image from which subsequent prints are to be made.

This invention has particular application as an exposure station for an electrophotographic device in which it is desired to make multiple copies from an original. By means of the present invention an image of the original may be projected a single time onto the photoconductive-liquid crystal sandwich S to form a temporary image which in turn may be projected to exposure sequentially a plurality of charged photosensitive surfaces as they are moved through the exposure station and while another original is being positioned. As used herein, the term "photosensitive surface", is intended to denote a segment of endless photoconductive belt 2 which is of sufficient size to receive an image projected from a photoconductive-liquid crystal structure S. It will also be understood that the term is also applicable to a continuous web of photosensitive material fed from a supply roll to a take-up roll or to cut sheets of photosensitive paper.

Referring now to the logic and control circuit, which is illustrated in the drawing by standard symbols as disclosed in *American Standard Graphic Symbols For Logic Diagrams* (ASA Y32.14-1962), published by the Americal Institute of Electrical Engineers, the apparatus may include an arbitrary number counter 60 which the operator sets to a selected number representative of the number of prints or copies desired. Thereafter, the operator presses a print button 61 to energize the counter whereupon a signal is generated at the "one" output of the counter to provide a signal to AND gate 62. Another input to AND gate 62 is provided by a switch 64 which is positioned to be closed when an original such as film 30 is in position in film guides 36 for projection. Switch 64 is connected to a potential source 66 which in turn is connected to ground. The third input to AND gate 62 is provided when lamp 50 is not energized. Thus, if the print button has been depressed, the film is in the gate and light 50 is not on, as would be the case when initial operation of the machine begins, AND gate 62 is enabled to provide an output signal to single shot generator 68 which in turn provides a signal of a predetermined limited time duration to lamp 40 and to a solenoid 70 which opens shutter 46 to expose the photoconductive layer of the sandwich structure S to film 30. The signal from single shot generator 68 also sets flip-flop 71, so that a signal is provided from its "one" output, and energizes solenoid 72 to move switch 24 to apply the d.c. potential of source 26 across electrode 16 and 22 to create an electric field therebetween to form a temporary image on liquid crystal layer 20 in response to the exposure of the photoconductive layer 18, as described above. Conveniently, means (not shown) can be provided to vary exposure time, as required. Upon termination of the signal from single shot generator 68, AND gate 74, which has one input connected to the "one" terminal of counter 60 and a second input connected to single shot generator 68, is enabled to provide a signal to energize lamp 50 to project the temporary image on liquid crystal layer 20 onto a charged portion of photoconductive belt 2 in exposure station 8. This signal from AND gate 74 also enables AND gate 76 to provide a signal to single shot generator 78 which energizes solenoid 79 for a predetermined time to open shutter 58 to permit exposure of the photoconductive web to the temporary image. The exposure time can be varied by means (not shown), as required. During the exposure of photoconductive web 2, the same signal form AND gate 75 enables AND gate 80 which receives input signals from flip-flop 71 and protential source 66 if switch 64 is closed to supply a signal to single shot generator 81. Single shot generator 81 provides a signal which energizes motor 38 to advance the next original into exposure position and to clear flip-flop 71. Advantageously, the original is advanced during projection of the first temporary image. The signal from single shot generator 78 also is fed back to counter 60 to indicate that one of the selected number of prints has been made. This same signal is fed to the set terminal of flip-flop 82 and flip-flop 84. Thus, flip-flop 82 provides a signal to AND gate 86 which in turn provides a signal to a single shot generator 88 as soon as the signal from single shot generator 78 has terminated. The signal from single shot generator 88 energizes motor 4 so that photoconductive web 2 is advanced an incremental distance to bring the next charged section into the exposure station for subsequent exposure to the temporary image to form the next electrostatic latent image. In this way, the photoconductive surfaces are fed seriatim through exposure station 8.

It will be understood that after each incremental advance of motor 4 due to a signal from single shot generator 88, a signal is provided to AND gate 76 which will terminate the output signal therefrom. Upon termination of the signal from single shot generator 88, AND gate 76 provides another output signal to single shot generator 78 if there is still a signal from the "one" input of counter 60 so that solenoid 79 will be energized again to open shutter 58 and make another exposure. This sequence will continue until an exposure for the last of the number of prints to be made from a particular original has been made. Thus, the photoconductive surfaces are advanced seriatim through exposure station 8 for exposure. When the last exposure is made, the signal from single shot generator 78 causes an output signal to be generated from "zero" output of counter 60 which in turn cause several things to occur. First of all, the "zero" signal is supplied to an AND gate 90 which has another input connected to flip-flop 84 which was previously set by a signal from single shot generator 78 so that AND gate 90 now provides a signal through normally closed switch 92 to motor 4 so that the motor continues to run until the last image has been transferred at transfer station 12 whereupon means (not shown) will open switch 92 to stop the motor. When the signal to motor 4 is interrupted AND gate 94 will provide a signal to clear flip-flop 84. In addition, the signal from the "zero" output of counter 60 provides a signal to single shot generator 96 to operate solenoid 98 to connect switch 24 to a.c. source 28 momentarily to erase the temporary image on liquid crystal layer 20 and then return switch 24 to the intermediate position shown. This "zero" signal from counter 60 can also be used to discontinue charging of subsequent photoconductive surfaces, by means not shown. At this point, all operations of the apparatus stop and the apparatus is in condition for making prints from a second original, which has already been positioned, when the operator sets the number of prints desired on counter 60 and presses the print button to initiate the cycle as previously described.

From the foregoing, the advantages of this invention are readily apparent. A method and apparatus has been provided wherein multiple prints may be made from a temporary image which is formed by a single exposure to an original. This facilitates the removal of a first original from an exposure gate and the positioning of a second original during the time that one or more copies are made from the first temporary image to provide a device which can be recycled rapidly to make copies from other originals.

It will be understood that different circuitry could be used than that disclosed and that if it is desired to project both the original image and the temporary image simultaneously, a photoconductive layer for the liquid crystal sandwich structure must be chosen which is sensitive to a limited portion of the electromagnetic spectrum such as ultraviolet light in which case lamp 40 would be ultraviolet. In this case, the temporary image can be projected by white light. In this case, a suitable photoconductive material is poly-N-vinylcarbozole or triphenylamine dispersed in a poly-styrene vehicle. One suitable nematic liquid crystal material comprises 80 mol percent of Butyl p-(p-ethoxyphenoxycarbonyl)-phenyl carbonate and 20 mol percent of p-[N-(p-methoxybenzylidene) amino] phenyl acetate. This material is a mesophase between 42°C and 52°C. Another suitable material is made up one-third by weight of each of P-[(p-methoxybenzylidene) amino] phenyl acetate; p-(p-methoxybenzylidene) amino butyrate; and p-(p-butoxybenzylidene) amino acetate which is a mesophase between 25°C and 55°C. Other suitable materials are listed on pp. 11–13 of *Molecular Structure and the Properties of Liquid Crystals* by G. W. Grey (1962). Since nematic liquid crystal layers will retain an image only so long as a potential is applied across them, it is necessary to maintain switch 24 in circuit with d.c. potential 26, such as 250 to 400 volts, as long as the temporary image on the liquid crystal is to be projected. Other ranges of electromagnetic radiation can be selected so long as the photosensitive surface upon which a latent image is to be made is sensitive to a particular range of the electromagnetic spectrum which is used to project the temporary image.

The invention has been described in detail with reference to a preferred embodiment thereof, but it will be understood that variations and modifications can be effected within the spirit and scope of the invention.

I claim:

1. Apparatus for forming multiple images of each of a plurality of originals sequentially on a plurality of photosensitive surfaces at an exposure station, said apparatus comprising:
   means for successively forming an erasable, temporary image from each of the plurality of originals, said forming means including:
   a layered sandwich structure having in order,
   a first transparent electrode,
   a transparent photoconductive layer,
   a control layer which is substantially transparent in the absence of an electric field and scatters light under the influence of an electric field, and
   a second transparent electrode,
   means for applying a potential between said electrodes to create an electric field therebetween, and
   means for exposing said photoconductive layer through said first transparent electrode to each of said originals to render said photoconductive layer more conductive in exposed areas to increase the electric field across correspponding portions of said control layer to form said temporary image of the original on said control layer;
   activatable means for exposing sequentially each of a plurality of photosensitive surfaces to each temporary image to form a latent image; and
   means for erasing each temporary image after projection thereof onto each of said plurality of photosensitive surfaces.

2. Apparatus, as claimed in claim 1, further including:
   means for advancing said photosensitive surfaces seriatim into and out of the exposure station in response to termination of exposure of each said photosensitive surface in the exposure station.

3. Apparatus, as claimed in claim 2, further including:
   means for activating said exposing means in response to advancement of said photosensitive surfaces.

4. Apparatus, as claimed in claim 1, wherein said temporary image forming means includes:
   means for positioning each original to form each temporary image; and
   means for advancing said originals seriatim into and out of said positioning means in response to formation of a temporary image of an original in said positioning means.

5. Apparatus, as claimed in claim 1, wherein said control layer comprises:
   liquid crystal material.

6. Apparatus, as claimed in claim 1, further including:
   means for disabling said potential applying means after formation of a temporary image.

7. Apparatus for making multiple images sequentially on successive photosensitive surfaces in an exposure station from a temporary erasable image formed from a single exposure to an original, said apparatus comprising:
   a layered sandwich structure which includes in order:
   a first transparent electrode;
   a transparent photoconductive layer;
   a liquid crystal layer; and
   a second transparent electrode;
   a first source of potential for application across said electrodes at least during formation of said temporary image;
   means selectively operable to apply said first source of potential across said transparent electrodes at least during formation of said temporary erasable image;
   means for exposing said photoconductive layer to a radiation pattern corresponding to a first original for a predetermined exposure time when said first potential is applied across said electrodes to form a first temporary image on said liquid crystal layer;
   means for projecting radiation through said layered sandwich structure to expose a first photosensitive surface in the exposure station to said first temporary image to form a corresponding latent image on said first photosensitive surface;
   control means for enabling said operable means during exposure to said radiation pattern and responsive after a predetermined exposure time sequentially; to disable said means for projecting radiation to move an exposed photosensitive surface out of the exposure station and move an unexposed photosensitive surface into the exposure station, and to enable said means for projecting radiation to expose said unexposed photosensitive surface to said first temporary image to form a corresponding latent image on said second photosensitive surface.

8. Apparatus, as claimed in claim 7, wherein said control means further includes:
   means to disable said operable means upon formation of said temporary image.

9. Apparatus, as claimed in claim 8, further including:
   a second source of potential for application across said electrodes to erase said temporary image; and wherein said operable means is also operable to apply said second source of potential across said electrodes, said control means further including:
   means to enable said operable means to apply said second potential across said electrods upon exposure of a predetermined number of photosensitive surfaces to said temporary image.

10. Apparatus, as claimed in claim 9, wherein:
said first source of potential is a d.c. source, and
said second source of potential is an a.c. source.

11. Apparatus as claimed in claim 7 further including:
means responsive to exposure to said first temporary image for moving said first original out of said projection plane and for moving a second original into said projection plane.

12. Apparatus for making multiple copies sequentially on photosensitive material in an exposure station from an original which is removable during sequential exposure of the photosensitive material for replacement by another original from which one or more copies are to be made, said apparatus comprising:
a layered sandwich structure that is capable of having a temporary image formed therein, which sandwich structure includes in order:
a first transparent electrode;
a transparent photoconductive layer;
a liquid crystal layer; and
a second transparent electrode;
a first source of potential connectable across said electrodes;
a switch operable to connect said electrodes across said first potential source at least during formation of said temporary image;
original advancing means for moving originals seriatim into and out of said projection plane;
means for exposing said photoconductive layer to a radiation pattern of an original and for enabling said switch to apply said first potential across said electrodes at least during formation of the temporary image of the original in said liquid crystal layer;
means for moving photosensitive material seriatim into and out of the exposure station;
means for projecting radiation in response to formation of said temporary image through said sandwich structure to expose photosensitive material in the exposure station to said temporary image;
means responsive to said radiation projecting means to enable said original advancing means to bring another original into said projection plane while said temporary image is being projected;
means for enabling said photosensitive material moving means in response to exposure of the photosensitive material in the exposure station to move the exposed photosensitive material out of the exposure station and position unexposed photosensitive material in the exposure station;
counting means having a first input for selecting the number of copies to be made from an original, and having a second input for receiving a count signal each time photosensitive material is exposed to a temporary image, said counting means providing a first signal until the selected number of copies have been made; and
means for enabling said exposing means and for providing said count signal to said second input of said counting means in response to positioning of exposed photosensitive material in the exposure station and in response to said first signal from said counting means.

13. Apparatus, as claimed in claim 12, wherein said liquid crystal layer is a mixture of nematic and cholesteric material having a memory and said counting means provides a second signal when the selected number of copies have been made, said apparatus further including:
a second source of potential connectable across said electrodes to erase said temporary image;
means responsive to said second signal from said counting means to enable said switch to connect said electrodes across said second potential source to erase the temporary image in said liquid crystal layer.

14. In an electrophotographic apparatus which includes a photoconductive member movable along an endless path past a plurality of stations spaced along said path, said plurality of stations including: a charging station for placing a generally uniform electrostatic charge on said photoconductive member; an exposure station for exposing a charged portion of said photoconductive member to a pattern of radiation derived from an original to form an electrostatic latent image; a developing station for developing said electrostatic latent image to form a toner image; a transfer station to transfer the toner image to a receiver; and a cleaning station for removing residual toner particles from said photoconductive member, and activatable means for moving said photoconductive member along said endless path, the improvement in said exposure station comprising:
a layered sandwich structure which includes in order:
a first transparent electrode;
a photoconductive layer;
a liquid crystal layer; and
a second transparent electrode;
means for applying a first potential between said electrodes;
means for exposing said photoconductive layer to a radiation pattern for a predetermined exposure time while said first potential is applied across said electrodes to render exposed areas of said photoconductive layer more conductive than unexposed areas thereof to form a first temporary image on said liquid crystal layer;
means for projecting radiation through said layered sandwich structure to exposure a first charged portion of said photoconductive member in said exposure station to said first temporary image to form a corresponding electrostatic latent image on said first charged portion;
control means responsive after a predetermined exposure time sequentially to disable said means for projecting said radiation within said second portion of the electromagnetic specturm, to activate said means for moving said photoconductive member to move the exposed portion from the exposure station to the developing station and to move a second charged portion from the charging station to the exposure station, and to enable said means for projecting radiation to expose said second charged portion of said photoconductive member to said first temporary image to form a corresponding electrostatic latent image on said second charged portion of said photoconductive member.

15. The improvement, as claimed in claim 14, further including:
means for applying a second source of potential across said electrodes for erasing said temporary image after a predetermined number of exposures of successive portions of said photoconductive member.

* * * * *